Jan. 8, 1963  S. A. MURDOCK ETAL  3,072,600
GRAFT COPOLYMERS OF MIXTURES OF ACRYLATES AND SULFONIC
ACIDS ON N-VINYL 2-OXAZOLIDINONE POLYMERS, IMPROVED
ACRYLONITRILE POLYMER COMPOSITIONS, AND
METHOD OF PREPARATION
Filed Oct. 5, 1959

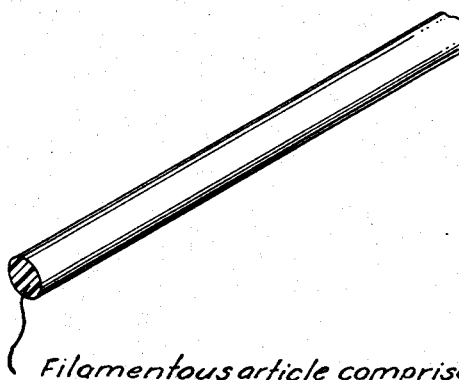

Filamentous article comprised
of an acrylonitrile polymer having
a graft copolymer of an am-
inoethylacrylate or methacrylate
monomer graft copolymerized
upon an N-vinyl-2 oxazolidinone
/vinyl lactam copolymer sub-
strate incorporated therein.

INVENTORS.
Stanley A. Murdock
Clyde W. Davis
Forrest A. Ehlers
BY
THEIR ATTORNEY

United States Patent Office 3,072,600
Patented Jan. 8, 1963

3,072,600
GRAFT COPOLYMERS OF MIXTURES OF ACRYLATES AND SULFONIC ACIDS ON N-VINYL-2-OXAZOLIDINONE POLYMERS, IMPROVED ACRYLONITRILE POLYMER COMPOSITIONS, AND METHOD OF PREPARATION
Stanley A. Murdock, Rancho Cordova, Calif., Clyde W. Davis, Williamsburg, Va., and Forrest A. Ehlers, Walnut Creek, Calif., assignors to The Dow Chemical Company, Midland, Mich., a corporation of Delaware
Filed Oct. 5, 1959, Ser. No. 844,320
18 Claims. (Cl. 260—45.5)

The present invention resides in the general field of organic chemistry and contributes specifically to the polymer art, especially with respect to certain graft copolymers and fiber-forming polymer blends obtainable therewith. In this way, the invention is pertinent to the man-made synthetic textile fiber industry.

The invention is particularly concerned with the graft copolymeric products of mixtures of certain monomeric acrylates and certain monomeric organic sulfonic acid compounds that are graft copolymerized in admixture upon preformed copolymer substrates of N-vinyl-2-oxazolidinones and N-vinyl lactams (hereinafter referred to as VO/VL copolymers). Such graft copolymeric products have especial utility as dye-receptive, antistatic and stabilizing additaments for acrylonitrile polymer compositions which, advantageously, may be of the fiber-forming variety. The invention is also concerned with the compositions that may be obtained by blending the graft copolymers with acrylonitrile polymers, as well as with shaped articles which have been fabricated therefrom, that have significantly enhanced properties and characteristics as regards improvements in and relating to enhanced dye-receptivity, minimized inherent propensity to accumulate electrostatic charges and an augmented natural stability to various deteriorating influences, including stability against becoming deleteriously influenced and degraded upon exposure to heat at elevated temperatures and light.

Within the scope and purview of the invention there is comprehended both the novel and utile graft copolymer and blended polymer compositions of the indicated varieties (as well as various shaped articles fabricated therefrom and comprised thereof) and advantageous methods for their preparation.

It is the main purpose and primary design of the present invention to provide and make available graft copolymers of certain acrylate monomers admixed with certain monomeric organic sulfonic acid compounds upon preformed VO/VL copolymer substrates, which graft copolymers are especially well suited for being incorporated in acrylonitrile polymer compositions, particularly polyacrylonitrile, to serve in the indicated treble capacity of dye-assisting adjuvants, antistatic agents and stabilizing ingredients.

It is also a principal aim and concern of the invention to furnish acrylonitrile polymer compositions of the above-indicated and hereinafter more fully delineated type and shaped articles therefrom that have, as intrinsic and distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light as well as to certain chemical conditions such alkaline environments.

The blended polymer compositions of the present invention which fulfill such ends and offer corollary advantages and benefits, as will hereinafter be manifest, are, in essence, comprised of an intimate and practically inseparable blend or alloy constitution of (A) an acrylonitrile polymer that contains in the polymer molecule at least about 80 weight percent of polymerized acrylonitrile, any balance being polymerized units of at least one other ethylenically unsaturated monomeric material that is copolymerizable with acrylonitrile, which acrylonitrile polymer preferably is of the fiber-forming variety and, most advantageously, is polyacrylonitrile and (B) a minor proportion of a beneficial graft copolymeric additament, also a subject of the invention, that functions and serves simultaneously in the treble capacity of a dye-assisting adjuvant, permanent antistatic agent and stabilizer and which is comprised of the graft copolymerized polymerization product of (a) a mixture of monomers consisting of (1) a monomeric 2-aminoethylacrylate or 2-aminoethylmethacrylate or their monomeric dimethyl or diethyl derivatives, as hereinafter more fully delineated, and (2) a monomeric organic sulfonic acid compound (including free acid compounds and ester or salt derivatives) that contains a substituent, reactive alkenyl, advantageously vinyl, group in its molecule; upon (b) a preformed VO/VL copolymer trunk or base substrate (as hereinafter more precisely delineated), particularly a copolymer of N-vinyl-5-methyl-2-oxazolidinone (VO-M) and N-vinyl-2-pyrrolidone (VP).

The method of the invention by which such compositions may be made involves incorporating the minor proportion of the graft-copolymerized polymeric additament in and with the acrylonitrile polymer base by any of several beneficial techniques, hereinafter more thoroughly defined, adapted to suitably accomplish the desired result. The graft copolymers are themselves made by graft copolymerizing the mixture of monomers upon the preformed VO/VL copolymer substrate, as hereinafter demonstrated.

Without being limited to or by the specific embodiments and modes of operation set forth, the invention is exemplified in and by the following docent illustrations wherein, unless otherwise indicated, all parts and percentages are to be taken on a weight basis.

ILLUSTRATION "A"

A polymeric additament satisfactory for use in the practice of the present invention is prepared by charging into a suitable reaction vessel about 5.9 grams of ethylene sulfonic acid; about 9.0 grams of 2-aminoethylmethacrylate, hydrochloride (2-AEMA, HCl); 59.5 grams of a VO-M/VP copolymer of about a 30:70 respective weight ratio of copolymerized monomeric ingredients and having a Fikentscher K-value of about 30; 175 grams of water and 0.2 gram of ammonium persulfate. The pH of the resulting mixture is about 1. The mixture is heated while being maintained in a nitrogen atmosphere, with continued agitation, for about 18 hours.

The resulting graft copolymer product is soluble in the aqueous polymerization mass. Conversion of the monomers to polymers is found to be about 95 percent to provide a graft copolymer product that contains about 84 percent of the VO-M/VP copolymer constituent upon which there is graft copolymerized about 6 percent of the polymerized ethylene sulfonic acid constituent and 10 percent of the polymerized 2-AEMA, HCl constituent.

The dissolved graft copolymeric product is diluted with water to form a solution having about 2.5 percent of polymeric solids contained therein. This is used as an impregnating bath according to the procedure of the following illustration to obtain polyacrylonitrile fibers containing intimately incorporated therein about 3.4 percent, based on the weight of the final fiber product (o.w.f.), of the graft copolymeric additament. The graft copolymer-containing fiber product is found to have good dye-receptivity, quite satisfactory stability to heat and light, and an unusually slight or low propensity to accumulate charges of static electricity.

To determine the extent of its stability to ultraviolet light, the graft copolymer-containing fiber product is placed, under standard test conditions, in an Atlas Fadeometer. No discernible break in color is observed until after about 240 hours of exposure. In comparison, an ordinary unmodified polyacrylonitrile fiber of the same type which is tested in the same way for control purposes breaks in color after only about 120 hours of ultraviolet light exposure.

ILLUSTRATION "B"

The general procedure of the first illustration is followed to prepare two polymeric additaments with the following mixture that is duplicated to provide polymerization charges for each:

| | |
|---|---|
| Sodium styrene sulfonate_____parts__ | 20.1 |
| 2-aminoethylmethacrylate _____do____ | 18.1 |
| 30:70 VO-M/VP Copolymer (as in Illus. "A") _____parts__ | 156.4 |
| Water _____do____ | 350 |
| pH of mixture_____About | 6 |
| Ammonium persulfate_____parts__ | 0.4 |

One of the charges is heated under a nitrogen blanket at 49° C., with continued agitation, for about 19 hours. Conversion of the monomeric constituents from the charge to polymeric product is about 95.9 percent. The polymeric product contains about 84 percent of VO-M/VP copolymer; about 8.5 percent of the polymerized sodium styrene sulfonate monomer; and about 7.5 percent of the polymerized 2-AEMA monomer. The polymer product is obtained as a stable white emulsion which consists essentially of a graft copolymer of the sodium styrene sulfonate and the 2-AEMA on the VO-M/VP.

The pH of the other charge is adjusted to about 2 with hydrochloric acid and the reaction mass is then heated at the boiling point for about 1½ hours during which time there is obtained a complete 100 percent conversion of the monomeric constituents to polymeric product. The polymeric product is obtained as a stable white emulsion in the aqueous medium and is found to consist of about 81 percent of the VO-M/VP copolymer; about 10 percent of the polymerized sodium styrene sulfonate monomer; and about 9 percent of the polymerized 2-AEMA monomer. The polymeric product is likewise a graft copolymer of the sodium styrene sulfonate and 2-AEMA on VO-M/VP copolymer.

Polyacrylonitrile fibers containing about 8 percent of the first described of the above graft copolymers are prepared by impregnating, during their hot stretching, filamentary structures that are in aquagel condition after having been salt-spun. A boiling aqueous dispersion of the graft-copolymer that contains about 1½ percent graft copolymeric solids is employed as the hot-stretching and impregnating bath. The polyacrylonitrile aquagel fiber that is employed is obtained by extruding a spinning solution of fiber-forming polyacrylonitrile comprised of about 10 parts of the polymer dissolved in 90 parts of a 60 percent aqueous solution of zinc chloride through a spinnerette having 300 individual 6 mil diameter orifices into an aqueous coagulating bath that contains about 42 percent of dissolved zinc chloride to form a multiple filament tow. After being spun, the tow bundle of coagulated polyacrylonitrile aquagel fiber is washed substantially free from salt upon being withdrawn from the coagulating bath and then hot-stretched for orientation while being simultaneously impregnated with the graft copolymer to a total stretched length that is about thirteen times its original extruded length.

Following the hot-stretching impregnation, the aquagel fiber is irreversibly dried at 150° C. to destroy the water-hydrated structure and convert it to a finished fiber form. It is then heat set for five minutes at 150° C. The finally obtained 3 denier fiber product has a tenacity of about 3.5 grams per denier, an elongation of about 33 percent and a wet yield strength of about 0.85 gram per denier. The graft-copolymer-containing acrylonitrile polymer fiber product has excellent natural stability to heat and light as well as against becoming degraded under the influence of aqueous alkaline media at pH levels as high as 10. It is found to be nearly free of propensity under normally humid conditions to accumulate charges of static electricity upon handling; being about commensurate with viscose rayon fibers in this regard. As is widely appreciated, viscose rayon yarn and fibers are not considered to be afflicted to a troublesome degree with problems due to static.

The graft-copolymer-impregnated fiber product dyes well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL is preformed at the 4 percent level according to conventional procedure in which the fiber sample is maintained for about one hour at the boil in the dyebath which contains the dyestuff in an amount equal to about 4 percent of the weight of the fiber. The dyebath, also contains sodium sulfate in an amount equal to about 15 percent of the weight of the fiber and has a bath-to-fiber weight ratio of about 30:1. After being dyed, the fiber is rinsed in water and dried for about 20 minutes at 80° C.

The dye-receptivity of the Calcodur Pink 2BL-dyed fiber is then evaluated spectrophotometrically by measuring the amount of monochromatic light having a wave length of about 520 millimicrons from a standard source that is reflected from the dyed sample. A numerical value on an arbitrarily designated scale from zero to one hundred is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by thoses killed in the art to be representative of a degree of dye-receptivity that readily meets or exceeds the most rigorous practical requirements and is ordinarily assured of receiving general commercial acceptance and approval.

The Calcodur Pink 2BL-dyed polyacrylonitrile fibers containing the above-described polymeric additament in accordance with the invention have a reflectance value of about 20. In contrast, ordinary unmodified polvacrylonitrile fibers of the same type generally have a reflectance value of about 130 on the same numerical scale.

The antistatic properties of the graft-copolymer-containing fiber are then determined by measuring the electrical conductance of the fiber product at various humidities. As will be appreciated by those who are skilled in the art, the basis for such a test is that all fibers have a tendency to generate electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested are found by determining their electrical resistances. Resistance, of course, is the reciprocal quantity of conductivity. In order to permit various fiber samples to be compared on the common basis, the conductivities of the samples tested are actually measured as volume resistivities according to the following formula:

Volume resistivity $$= \frac{(Resistance)(Cross\text{-}sectional\ area)}{Path\ length\ between\ electodes\ to\ which\ sample\ being\ tested\ is\ attached}$$

The units of volume resistivity are ohm–cm.$^2$/cm.

Prior to being tested, the graft copolymer-containing polyacrylonitrile fiber prepared in the indicated manner is scoured for ½ hour at the boil using about 1.0 percent o.w.f. of an alkylphenoxypolyoxyethylene ethanol nonionic detergent and a 30:1 volume:fiber ratio of water. After being scoured, the fiber sample is washed thoroughly with water and dried. The actual resistivity of each sample is determined after the sample being tested is conditioned for seventy-two hours at the particular temperature and relative humidity conditions involved by tautly connecting a web-like sample of the yarn between two electrodes, each of which are 9 centimeters long spaced parallel 13 centimeters apart, and across which there is applied a 900 volt direct current potential. For purposes of comparison, the volume resistivities of cotton, wool and an unmodified polyacrylonitrile fiber (obtained in the same way as the graft-copolymer-containing fiber but without having the polymeric additament incorporated therein) are also tested in the indicated manner along with the graft-copolymer-containing fiber in accordance with the present invention.

The results are set forth in the following tabulation which indicates the volume resistivities at various relative humidities (R.H.) at 25° C. of each of the samples tested.

VOLUME RESISTIVITIES OF VARIOUS FIBER SAMPLES COMPARED TO POLYACRYLONITRILE FIBERS IMPREGNATED WITH GRAFT COPOLYMERS OF SODIUM STYRENE SULFONATE AND 2-AEMA, HCl ON VO-M/VP COPOLYMER SUBSTRATE

| Sample | Volume Resistivity, Ohm-cm.$^2$/cm. | | | |
|---|---|---|---|---|
| | 32 percent R.H. | 47 percent R.H. | 58 percent R.H. | 66 percent R.H. |
| Graft-copolymer-impregnated polyacrylonitrile fiber | 6.7×10$^{11}$ | 1.6×10$^{10}$ | 2.1×10$^9$ | 8.4×10$^7$ |
| Cotton | 6.4×10$^9$ | 2.7×10$^8$ | 3.0×10$^7$ | 5.4×10$^6$ |
| Wool | 5.0×10$^{12}$ | 2.0×10$^{11}$ | 1.9×10$^{10}$ | 3.8×10$^9$ |
| Unmodified polyacrylonitrile fiber | 3.0×10$^{14}$ | 2.7×10$^{13}$ | 5.0×10$^{12}$ | 1.2×10$^{12}$ |

As is apparent from the foregoing, the graft copolymer-containing fiber sample, even after being severely scoured, has electrical conductance properties much superior to ordinary polyacrylonitrile fibers and only slightly poorer than cotton. At the same time, the physical properties of the graft copolymer-containing fiber are excellent, being about equal to those of the unmodified polyacrylonitrile fibers.

Equivalent results are obtained when the foregoing procedure is repeated excepting to impregnate the aquagel fiber with the copolymer additive prior to the stretch-drawing operation on the fiber.

ILLUSTRATION "C"

Following the procedure of the preceding illustrations, a polymeric additament suitable for use in the practice of the present invention is made from the following charge:

2-sulfoethylacrylate, sodium salt (SEA, Na)
_____ grams__ 10
30:70 VO-M/VP Copolymer, K-50 _____do____ 72.8
Water _____ml__ 175
Ammonium persulfate _____gram__ 0.2

Prior to polymerization, the pH of the mixture is adjusted to about 3.0 with HCl. The mixture is then polymerized under nitrogen for about 18 hours at 50° C. with continued agitation to make a clear, colorless solution. The copolymer product contains about 10 percent of polymerized SEA, Na; 9 percent of 2-AEA, HCl; and 81 percent of the VO-M/VP.

Polyacrylonitrile fibers are then impregnated with the graft copolymerized polymeric additament using about a 2 percent aqueous solution of the graft copolymer as an impregnating bath. A product containing about 5.05 percent of the graft copolymer additament therein, based on the weight of the fiber, is obtained. The modified fiber product dyes well, has low static characteristics and is exceptionally light stable. It withstands more than 240 hours of ultraviolet light exposure in an Atlas Fadeometer before there is any break in color.

ILLUSTRATION "D"

The procedure of Illustration "C" is repeated with the following charge:

| | Grams |
|---|---|
| Sodium styrene sulfonate | 10.05 |
| 2-AEMA, HCl | 9.05 |
| 30:70 VO-M/VP copolymer, K-30 | 78.2 |
| Ammonium persulfate | 0.2 |

A white stable emulsion of the water-insoluble graft copolymer product is obtained with high conversion of the monomeric ingredients to polymer product. The polymeric additament contains about 10 percent of polymerized styrene sulfonic acid; about 9 percent of polymerized 2-AEMA, HCl; and about 81 percent of the VO-M/VP copolymer substrate. Polyacrylonitrile fibers are impregnated while in the aquagel condition with a 2.5 percent aqueous dispersion of the graft-copolymer product (pursuant to the general procedure set forth in Illustration "B") to provide a graft-copolymer-containing fiber having about 0.4 percent of the sodium styrene sulfonate constituent in the graft-copolymer present therein. The resulting graft-copolymer-containing fiber product has good physical properties, excellent heat, light and alkaline stability and dyes well to deep and level shades with Calcodur Pink 2BL, Calcocid Alizarine Violet, Amacel Scarlet BS and Sevron Brilliant Red 4G. The graft copolymer-containing fiber withstands 240 hours of ultraviolet light exposure in the Atlas Fadeometer before there is any sign of color break.

ILLUSTRATION "E"

The general procedure of Illustration "D" is repeated with a graft-copolymeric polymer additament prepared from the following charge:

Sodium styrene sulfonate _____grams__ 10.05
Dimethylaminoethylacrylate (DMAEA)__do____ 7.0
15:85 VO-M/VP copolymer, K-45 _____do____ 68.2
Water _____ml__ 175
Ammonium persulfate _____gram__ 0.2

Conversion of the monomer to polymer product is high as a result of the polymeriztaion which is conducted in the manner set forth in the foregoing illustration. The polymeric product contains about 11 percent of the polymerized sodium styrene sulfonate; about 8 percent of the polymerized DMAEA; and about 81 percent of the VO-M/VP copolymer.

Polyacrylonitrile aquagel fibers are impregnated with a 2.5 percent aqueous solution of the water-soluble graft copolymer product according to the above-indicated procedure so that the graft copolymer-containing fibers have a sufficient quantity of the polymeric additament incorporated therein to have about a 0.5 percent content of the polymerized sodium styrene sulfonate constituent of the graft copolymer. The resulting modified fiber product has excellent physical properties, good dyeability and satisfactory stability. Its static characteristics are about commensurate with those of cotton.

ILLUSTRATION "F"

About 21 grams of sodium styrene sulfonate, 16 grams of diethylaminoethylmethacrylate (DEAEMA), 99 grams of a 30:70 VO-M/VP copolymer having a Fikentscher K-value of about 50, 600 ml. of water and 0.8 gram of ammonium persulfate are charged into a reaction vessel and polymerized for 16 hours at 50° C. under a nitrogen atmosphere, with continued agitation, after the pH of the reaction mass is initially adjusted to about 3 with hydrochloric acid. Conversion to a clear, colorless, water-soluble graft copolymer product is nearly complete. Excellent results are achieved when the polymer product is incorporated in acrylonitrile polymer fibers as a dye-receptive, antistatic, stabilizing adjuvant.

ILLUSTRATION "G"

A graft copolymerized, dye-receptive, antistatic, stabilizing adjuvant is manufactured by graft-copolymerization of the following charge under a nitrogen atmosphere with continued agitation for 18 hours at 50° C. after initial adjusting of the pH of the charge to about 3 with hydrochloric acid:

| | Grams |
|---|---|
| SEA, Na | 10.0 |
| Dimethylaminoethylacrylate (DMAEA) | 6.4 |
| 25:75 VO-M/VP copolymer, K-45 | 65.6 |
| Water | 175 |
| Ammonium persulfate | 0.2 |

The resulting graft-copolymer is found to contain about 12 percent of the polymerized SEA, Na; about 8 percent of the polymerized DMAEA; and about 80 percent of the VO-M/VP copolymer. Polyacrylonitrile fibers in aquagel form are impregnated in the above-described manner with a 2.5 percent aqueous solution of the indicated copolymer product so that the finally obtained, dried, modified acrylonitrile polymer fibers contain about 0 3 percent of the polymerized SEA, Na constituents of the polymeric additament. The resulting fiber product dyes well, has very low static characteristics, and is exceptionally stable to light, heat and alkalinity. It withstands 240 hours of continuous ultraviolet light exposure in an Atlas Fadeometer before any color break can be denoted.

ILLUSTRATION "H"

About 1.66 grams of 2-AEMA, HCl; 2.01 grams of N-acryloyl taurine, sodium salt (the nomenclature "taurine" being commonly employed for the designation of 2-aminoethane-sulfonic acid); 8.55 grams of a 30:70 VO-M/VP copolymer having a Fikentscher K-value of about 57; 48.45 grams of water and 0.04 gram of potassium sulfate are mixed together and the pH adjusted to about 3 with HCl to provide a polymerization mixture. The mixture is heated for 16 hours, with continued agitation, under a nitrogen atmosphere at about 50° C. during which time conversion of the monomers to a water-insoluble graft copolymer product is substantially complete. The product is obtained in an aqueous emulsion. When it is impregnated in polyacrylonitrile aquagel fibers according to the foregoing procedures so as to obtain a modified polyacrylonitrile fiber product, the resulting fiber product has excellent dye-receptivity, low static characteristics and good stability to light, heat and alkaline conditions.

ILLUSTRATION "I"

Excellent results are obtained with a polymeric dye-receptive, antistatic, stabilizing additament for acrylonitrile polymer fibers with a graft-copolymer prepared in essential accordance with the method set forth in Illustration "H" using the following charge:

| | Grams |
|---|---|
| Acryloyl taurine, sodium salt | 2.01 |
| DMAEA | 1.71 |
| 30:70 VO-M/VP copolymer, K-30 | 8.69 |
| Water | 49.60 |
| Potassium persulfate | 0.04 |

Results similar to those set forth in the foregoing can also be obtained when the composition of the polymeric additaments is varied using other ingredients indicated to be within the scope of the invention and when the graft-copolymeric products are incorporated in polyacrylonitrile and other of the well known acrylonitrile polymer fibers to provide articles in accordance with the present invention by blending the graft copolymer product and fiber-forming acrylonitrile polymer in a spinning composition or dope prior to its extrusion into filamentary products by either wet-spinning or dry-spinning techniques. In such instances, incidentally, it may be desirable (in order to secure optimum benefit in the practice of the invention) to employ relatively larger quantities of the graft copolymeric additament than when surface impregnation is performed so that the presence of effective quantities of the additament at or near the surface of the article is assured.

Excellent results may also be obtained when other VO/VL copolymer substrates are employed for the graft copolymer additaments, such as copolymers of N-vinyl-5-ethyl-2-oxazolidinone and VP; copolymers of N-vinyl-2-oxazolidinone and VP; copolymers of VO-M and N-vinyl caprolactam; copolymers of VO-M and N-vinyl piperidone; and so forth (within the compositional ranges detailed below); and when other acrylonitrile polymer bases of the copolymeric variety other than polyacrylonitrile are modified with the additaments.

The graft copolymeric additaments that are employed in the practice of the invention, as is indicated in the foregoing, are graft copolymerized products of (a) mixtures of monomers consisting of (1) 2-aminoethacrylates and/or 2-aminomethacrylates having the formula

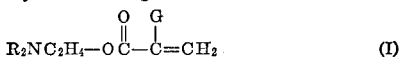

(I)

wherein each R is independently selected from the group consisting of hydrogen, methyl and ethyl and G is selected from the group consisting of hydrogen and methyl (typical examples of which are 2-aminoethylacrylate;
2-aminoethylmethacrylate;
methyl-2-aminoethylacrylate;
methyl-2-aminoethylmethacrylate;
dimethyl-2-aminoethylacrylate;
dimethyl-2-aminoethylmethacrylate;
ethyl-2-aminoethylacrylate;
ethyl-2-aminoethylmethacrylate;
diethyl-2-aminoethylacrylate;
diethyl-2-aminoethylmethacrylate;
methyl ethyl-2-aminoethylacrylate; and
methyl ethyl-2-aminoethylmethacrylate);

and (2) alkenyl group-containing organic sulfonic acids and derivatives thereof that are selected from the group of such compounds consisting of those represented by the formulae (including mixtures thereof):

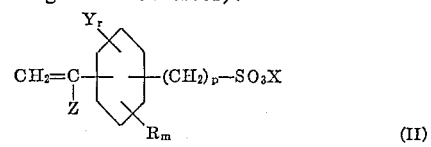

(II)

(Aromatic organic sulfonic acid compounds)

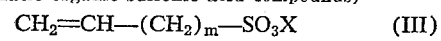

(III)

(Alkenyl organic sulfonic acid compounds)

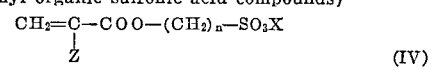

(IV)

(Sulfoalkylacrylate organic sulfonic acid compounds)

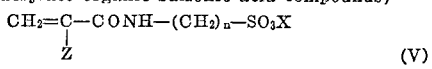

(V)

(Acryloyl taurine homolog compounds)

and

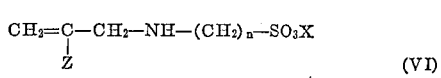

(VI)

(Allyl taurine homolog compounds)

all wherein X is hydrogen, an aliphatic hydrocarbon radical containing from 1 to 4 carbon atoms or an alkali metal ion; Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $m$ is an integer from 1 to 4; upon (b) preformed VO/VL copolymer substrates, particularly VO-M/VP copolymers.

Besides those specifically illustrated, other monomeric organic sulfonic acid compounds may also be utilized for the preparation of the graft copolymeric additaments of the present invention, such by way of illustration, as those which are set forth in the disclosure of United States Letters Patent No. 2,527,300. In addition to the sulfonic acid monomers specifically described in the foregoing examples, others that may advantageously be employed in the practice of the present invention include such organic sulfonic acids as 2-propene sulfonic acid; sodium para-vinylbenzene sulfonate; 2- and/or 3-sulfopropyl acrylate; 2-sulfoacrylic acid; sodium vinyl toluene sulfonate; potassium ortho-chloro-styrene sulfonate; 2-hydroxy-3-sulfopropyl acrylate, sodium salt; sodium 3-allyloxy-2-hydroxypropane sulfonate; 4-sulfophenyl acrylate, sodium salt; N-allyl imino di-(2-ethane sulfonic acid); and the like. Still others are set forth in the subsequent appendix annexed hereto.

The copolymers of N-vinyl-2-oxazolidinones (i.e., VO's) and N-vinyl lactams (i.e., VL's) that are utilized as preformed substrates in the preparation of the graft copolymeric additaments of the present invention are copolymers of (1) between about 10 and about 90 weight percent, based on the weight of the copolymer molecule, advantageously between about 40 and 60 weight percent, of polymerized N-vinyl-2-oxazolidinone and (2) between about 90 and 10 weight percent, based on the weight of the copolymer molecule, advantageously between about 60 and 40 weight percent, of polymerized N-vinyl lactam.

The monomeric N-vinyl-2-oxazolidinones employed for preparation of the VO/VL copolymer substrate are of the general structure:

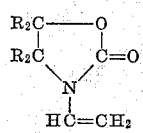

wherein each R is independently selected from the group consisting of hydrogen, alkyl radicals, and haloalkyl radicals of from 1 to about 4 carbon atoms, and aryl radicals of from 6 to about 10 carbon atoms. Advantageously, ring-substituted N-vinyl-2-oxazolidinones are employed, particularly those having a single alkyl or aryl substituent in the 5-position of the ring such as N-vinyl-5-methyl-2-oxazolidinone (VO–M); N-vinyl-5-ethyl-2-oxazolidinone (VO–E); N-vinyl-5-phenyl-2-oxazolidinone (VO–P); and so forth. Of course, if desired, non-ring-substituted N-vinyl-2-oxazolidinone may also be employed.

The N-vinyl lactam monomers that are utilized in the preparation of the preformed VO/VL copolymer substrates may be any of those (or their mixtures) which are variously characterized and generically known to the art as N-vinyl lactams or 1-vinyl lactams. Such monomers are disclosed and contemplated in United States Letters Patent Nos. 2,265,450; 2,371,804; and 2,335,454. Beneficially, the N-vinyl lactams that are employed are N-vinyl-2-pyrrolidone (VP), also known as N-vinyl-2-pyrrolidinone; N-vinyl-2-piperidone (VPip); N-vinyl caprolactam (VC); N-vinyl-5-methyl-2-pyrrolidone (VP–M); and the like, particularly VP.

It is desirable for the VO/VL copolymer that is used to be a water-soluble material. In cases where certain ring-substituted VO's are employed, such as VO–M, VO–E and VO–P, it is generally beneficial for the copolymer to contain at least about 40 weight percent of the VL copolymerized therein. Copolymers having substantially less VL may tend to water-insolubility and make it necessary to work with a product that may have a cloud (or precipitation) point in water or other aqueous solution beneath the boil. Copolymers containing from about 10 to about 30 weight percent VO are generally water-soluble at normal room temperatures (i.e., 20–25° C.) at solution concentrations as great as 20–30 weight percent, and frequently greater.

These N-vinyl-2-oxazolidinone copolymers and their preparation are discussed in U.S. Patents 2,946,772, filed February 27, 1958, and 2,948,708, filed April 3, 1958.

The graft copolymeric additaments that are prepared and employed in the practice of the invention may either be water-soluble or water-insoluble products. In either event, they are generally found to be readily dispersible in aqueous media by either dissolution therein or uniform dispersion throughout the medium to provide a usable product for impregnating purposes. The graft copolymers may generally be prepared by conventional methods of polymerization, including those which have been demonstrated in the foregoing exemplifying illustrations. In addition to the usual catalysts, including persulfates, organic and inorganic peroxides and azo type catalysts, the graft-copolymers may oftentimes be polymerized under the influence of high energy radiation such as by means of X-rays and the like, or simply by heating and evaporating the monomer-containing polymerization mixture. The graft-copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the graft copolymerized polymeric additaments can vary within rather wide limits. Advantageously, the content of the preformed VM polymer substrate upon which the monomeric constituents are graft copolymerized is between about 10 and about 90 percent, more advantageously between about 20 and about 80 percent of the weight of the graft copolymerized product with the content of either monomeric constituent being between about 10 and about 90, more advantageously from about 30 to about 70, mole percent of the polymerized monomer substituents in the graft copolymerized product. It may frequently be desirable for the monomeric constituents that are polymerized to be employed in nearly equivalent or about commensurate or equal molar proportions in the preparation of the graft copolymeric polymeric additament and for the quantity of the preformed VO/VL copolymer substrate to be at least half of the constitution of the graft copolymer product.

The polymerization system that is employed for the preparation of the copolymers employed in the present invention may consist of as much as 50 percent by weight of the monomers and preformed VO/VL copolymer substrate to be graft-copolymerized in the aqueous medium. The amount of monomeric and polymeric material that is provided in the polymerization system may be influenced somewhat by the manner in which it is intended to incorporate the product in the synthetic polymer compositions in order to provide the compositions of the invention.

If, for example, it is intended to incorporate the graft-copolymer products by blending into a fiber-forming composition prior to its fabrication into shaped articles, the copolymerization system may, if desired contain about equal proportions by weight of the charged materials and the polymerization medium which preferably is miscible with and tolerable in the spinning solution solvent being used. In case the graft-copolymer product is obtained as a gel, it may still be easily dispersed, after being dried and isolated from unreacted monomer, in order to be directly incorporated in the fiber-forming composition.

If the incorporation of the polymeric additament in a fiber-forming composition is to be achieved by impregnation therewith of an already-formed shaped article of the composition, it may be desirable to effect the polymerization so as to directly form the polymerization system as a suitable applicating emulsion or suspension or as a solution of the graft-copolymeric product depending on its particular solubility characteristics. For such purposes, the polymerization system may be prepared to contain as little as 2–10 percent by weight of the graft-copolymerizing ingredients. Preferably, such a polymerization may be conducted under the influence of vigorous agitation, especially to facilitate preparation of an emulsified or thoroughly dispersed product when a water-insoluble graft-copolymer is being made. It may also be beneficial under such circumstances to incorporate a dispersant or emulsifying agent in the polymerization system to facilitate obtaining a stable and homogenous emulsified product. Such a method for preparing the graft-copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the graft-copolymeric additaments may be impregnated from solution or suspension into the fiber while it is in a swollen or gel condition, as an acrylonitrile polymer fiber in an aquagel condition, in order to obtain the desired graft-copolymer-containing product.

In this connection, when it is desired to blend the polymeric additament in a synthetic polymer fiber-forming solution prior to its extrusion, such as an aqueous saline acrylonitrile polymer solution, the graft-copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the polymeric additament in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous, saline polyacrylonitrile solvent that is being employed in an aqueous solution of zinc chloride or its equivalent that contains at least about 55 percent and preferably about 60 percent by weight of dissolved zinc chloride, it may be advantageous to comminute the polymeric additament while it is in a mixture with the saline solvent solution that contains between about 5 and 10 percent by weight of the graft-copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of an insoluble graft-copolymeric additament in the acrylonitrile polymer solvent that is suitable for blending in the spinning solution of the acrylonitrile polymer to provide a spinnable composition may usually be obtained by milling the mixture of polymeric additament and solvent for an extended period that may exceed 100 hours. The suspension that is thereby obtained may then be directly blended in the proper proportions with the acrylonitrile polymer spinning solution to provide a composition in accordance with the present invention. Of course, many of the graft copolymer products of the invention are directly soluble in such spinning solutions.

If desired, the graft-copolymer-containing acrylonitrile polymer compositions may comprise as much as 20 or more weight percent of the graft-copolymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the graft-copolymeric additament that is less than 0.5 weight percent is employed. Advantageously, an amount between about 2 and 15 weight percent of the polymeric additament may thus be utilized in the composition. Greater advantages may often accrue when the amount of the polymeric additament that is incorporated in the composition is not in excess of about 10 weight percent, based on the weight of the composition.

As has been indicated, the graft-copolymeric additaments may be incorporated in the acrylonitrile polymer compositions according to various techniques. Thus, for example, the additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dispersing or dissolving them in a suitable liquid medium. Or, the compositions may be provided in fiber-forming system by sequentially dispersing or dissolving the polymers in any desired order in a suitable medium, as by incorporating the polymeric additament in a prepared acrylonitrile polymer spinning solution, dope or the like. As is obvious, the graft-copolymeric additaments employed in the practice of the present invention are frequently found to be insoluble. Despite this fact, they are, as has been indicated, readily dispersible in most solvents.

As is evident from the illustrative examples heretofore included, a highly advantageous technique for providing the compositions, particularly when acrylonitrile polymer fiber products are involved, is to apply or impregnate the polymeric additament in a known manner from an aqueous solution or dispersion thereof to a shaped acrylonitrile polymer article that is in an aquagel condition. Thus, an acrylonitrile polymer filamentary article that has been spun from an aqueous saline spinning solution may be conveniently passed, after its coagulation and while it is in an aquagel condition, through a water bath containing a dispersed graft-copolymeric additament in order to impregnate the filament with the graft-copolymer and provide a composition and an article in accordance with the invention.

In addition, in situ polymerization techniques may be employed to provide the graft-copolymeric additament in the fiber product. Thus, the compositions may be made by impregnating an acrylonitrile polymer, such as a shaped article in aquagel form or other swollen condition, with the unpolymerized monomers and the preformed VO/VL copolymer substrate and graft-copolymerizing them therein by means of radiation, dry heat or steam with or without other catalyzing influence.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 weight percent, based on solution weight, of zinc chloride or other known saline solvents for the polymer. Acrylonitrile polymer fiber products that are spun from saline fiber-forming systems may, by way of further illustration, be coagulated in more dilute saline solutions or a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1 also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TrN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing acrylonitrile polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes an Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Green 25); such basic dyes as Brilliant Green Crystals (Colour Index Basic Green 1), and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (both Colour Index dispersed Red 15), Celanthrene Pure Blue BRS 400 percent (Colour Index Dispersed Blue 1) and Acetamine Yellow N (Colour Index Dipsersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

*Appendix*

Representative of the various monomeric organic sulfonic acid compounds that may be employed satisfactorily in the practice of the present invention are those set forth in the following listing, wherein they are grouped according to the several designated types. The list, by no means exhaustive, includes species not mentioned in the foregoing.

*Aromatic alkenyl-containing sulfonic acid compounds* (Formula II):

Para-styrene sulfonic acid
    Ortho-styrene sulfonic acid
    Para-isopropenyl benzene sulfonic acid
    Para-vinyl benzyl sulfonic acid
    Ortho-isopropenyl benzyl sulfonic acid
    Sodium para-styrene sulfonate
    Potassium ortho-styrene sulfonate
    Methyl para-styrene sulfonate
    Ethyl para-vinyl benzyl sulfonate
    Ortho vinyl benzene sulfonic acid
    Isopropyl ortho-isopropenyl benzene sulfonate
    n-Butyl ortho-styrene sulfonate
    Teritary butyl para-styrene sulfonate
    2-chloro-4-vinyl benzene sulfonic acid
    4-bromo-2-isopropenyl benzene sulfonic acid
    3-vinyl toluene 6-sulfonic acid, sodium salt
    2-ethyl-4-vinyl-benzene sulfonic acid
    2,3-dichloro-4-vinyl benzene sulfonic acid
    2,3,5-tribromo-4-vinyl benzene sulfonic acid
    2-chloro-3-vinyl-toluene-6-sulfonic acid
    2,3-diethyl-4-vinyl-benzyl sulfonate, sodium salt

*Alkenyl sulfonic acid compounds* (Formula III):

Ethylene sulfonic acid
    Sodium ethylene sulfonate
    Potassium ethylene sulfonate
    Methyl ethylene sulfonate
    Isopropyl ethylene sulfonate
    1-propene 3-sulfonic acid
    1-propene 1-sulfonic acid, sodium salt
    1-propene 2-sulfonic acid, ethyl ester
    1-butylene 4-sulfonic acid, n-butyl ester
    1-butylene 3-sulfonic acid
    Tertiary butylene sulfonic acid

*Sulfoalkylacrylate compounds* (Formula IV):

Sulfomethylacrylate
    2-sulfoethylacrylate
    Sulfomethylmethacrylate, sodium salt
    2-sulfoethylmethacrylate, methyl ester
    2-sulfoethylmethacrylate, potassium salt

*Acryloyl taurine and homolog compounds* (Formula V):

N-acryloyl taurine
    N-acryloyl taurine, sodium salt
    N-methacryloyl taurine, methyl ester
    N-methacryloyl taurine, potassium salt
    N-acryloyl taurine, ethyl ester
    N-acryloyl-aminomethane sulfonic acid N-methacryloyl-aminomethane sulfonic acid, sodium salt Methyl N-methacryloyl-aminomethane sulfonate

*Allyl taurine and homolog compounds* (Formula VI):

Allyl taurine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-allyl-aminomethane sulfonate
Lithium N-methallyl-aminomethane sulfonate
n-Butyl N-allyl-aminomethane sulfonate

What is claimed is:

1. Composition comprising between about 80 and about 99.5 weight percent, based on composition weight, of (A) a polymerized ethylenically unsaturated monomeric material containing at least about 80 weight percent of polymerized acrylonitrile, and (B) between about 20 and about 0.5 weight percent, based on composition weight, of a graft copolymer of (*a*) from about 10 to about 90 weight percent, based on graft copolymer weight, of a mixture of monomers consisting of (1) from about 10 to about 90 mole percent of an acrylate monomer of the formula:

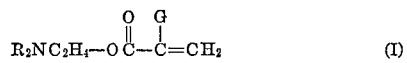
$$R_2NC_2H_4-OC(=O)-C(G)=CH_2 \quad (I)$$

wherein each R is independently selected from the group consisting of hydrogen, methyl and ethyl and G is selected from the group consisting of hydrogen and methyl; and (2) from about 90 to about 10 mole percent of an alkenyl-group containing organic sulfonic acid compound selected from the group consisting of those represented by the formulae:

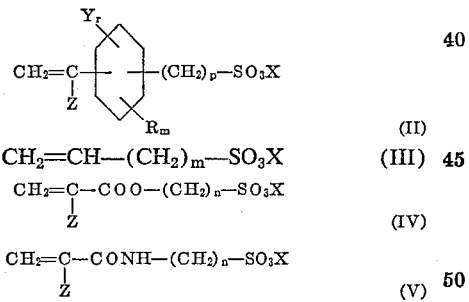

$$CH_2=CH-(CH_2)_m-SO_3X \quad (III)$$

$$CH_2=C(Z)-COO-(CH_2)_n-SO_3X \quad (IV)$$

$$CH_2=C(Z)-CONH-(CH_2)_n-SO_3X \quad (V)$$

and

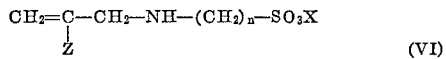

wherein X is selected from the group consisting of hydrogen, aliphatic hydrocarbon radicals containing from 1 to about 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with (*b*) from about 90 to about 10 weight percent, based on graft-copolymer weight, of a copolymer of a N-vinyl-2-oxazolidinone and a N-vinyl lactam, said copolymer being from about 10 to about 90 weight percent, based on copolymer weight, of a N-vinyl-2-oxazolidinone monomer copolymerized with from about 90 to about 10 weight percent, based on copolymer weight, of a N-vinyl lactam monomer.

2. The composition of claim 1, wherein the graft copolymer is styrene sulfonic acid and 2-aminoethyl-methacrylate on a copolymer of N-vinyl-5-methyl-2-oxazolidinone and N-vinyl-2-pyrrolidone.

3. The composition of claim 1, wherein the graft copolymer is 2-sulfoethylacrylate and 2-aminoethylmethacrylate on a copolymer of N-vinyl-5-methyl-2-oxazolidinone and N-vinyl-2-pyrrolidone.

4. The composition of claim 1, wherein the graft copolymer is styrene sulfonic acid and dimethylaminoethylacrylate on a copolymer of N-vinyl-5-methyl-2-oxazolidinone and N-vinyl-2-pyrrolidone.

5. The composition of claim 1, wherein the graft copolymer is acryloyl taurine and dimethylaminoethylacrylate on a copolymer of N-vinyl-5-methyl-2-oxazolidinone and N-vinyl-2-pyrrolidone.

6. The composition of claim 1, wherein the graft copolymer is styrene sulfonic acid and diethylaminoethylmethacrylate on a copolymer of N-vinyl-5-methyl-2-oxazolidinone and N-vinyl-2-pyrrolidone.

7. The composition of claim 1, wherein the acrylonitrile polymer is polyacrylonitrile.

8. The composition of claim 1 in a solvent for polyacrylonitrile.

9. A filamentary shaped article having the composition as set forth in claim 1.

10. Method for the preparation of a dye-receptive, antistatic, stable to light and heat, synthetic, hydrophobic polymer composition which comprises physically blending together between about 0.5 and about 20 weight percent, based on composition weight, of (B) a graft copolymer of from about 10 to about 90 percent by weight, based on graft copolymer weight, of (*a*) a mixture of monomers consisting (1) from about 10 to about 90 mole percent of an acrylate monomer of the formula:

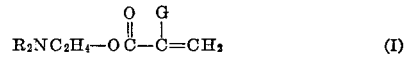
$$R_2NC_2H_4-OC(=O)-C(G)=CH_2 \quad (I)$$

wherein each R is independently selected from the group consisting of hydrogen, methyl and ethyl and G is selected from the group consisting of hydrogen and methyl; and (2) from about 90 to about 10 mole percent of an alkenyl-group containing organic sulfonic acid compound selected from the group consisting of those having the formulae:

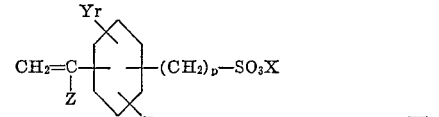

$$CH_2=CH-(CH_2)_m-SO_3X \quad (III)$$

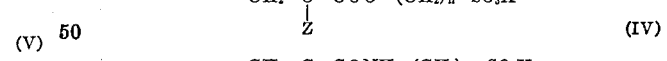

$$CH_2=C(Z)-CONH-(CH_2)_n-SO_3X \quad (V)$$

and

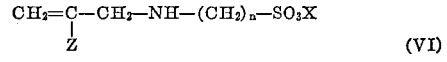

wherein X is selected from the group consisting of hydrogen, aliphatic hydrocarbon radicals containing from 1 to about 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (*b*) from about 90 to about 10 weight percent, based on graft copolymer weight, of a copolymer of a N-vinyl-2-oxazolidinone and a N-vinyl lactam, said copolymer being from about 10 to about 90 weight percent, based on copolymer weight, of a N-vinyl-2-oxazolidinone monomer copolymerized with from about 90 to about 10 weight percent, based on copolymer weight, of a N-vinyl lactam monomer, and (A) between about 80 and about 99.5 weight percent, based on composition weight, of a polymerized ethylenically unsaturated monomeric material containing at least about 80 weight percent of polymerized acrylonitrile.

11. Method for the preparation of a dye-receptive, antistatic, stable to light and heat, synthetic, hydrophobic polymer composition which comprises immersing an aquagel of a polymerized ethylenically unsaturated monomeric material containing at least about 80 weight percent of polymerized acrylonitrile in the form of a shaped article into an aqueous dispersion of a graft copolymer of (a) from about 10 to about 90 weight percent, based on graft copolymer weight, of a mixture of monomers consisting of (1) from about 10 to about 90 mole percent of an acrylate monomer of the formula:

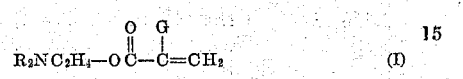
(I)

wherein each R is independently selected from the group consisting of hydrogen, methyl and ethyl and G is selected from the group consisting of hydrogen and methyl; and (2) from about 90 to about 10 mole percent of an alkenyl-containing organic sulfonic acid compound selected from the group consisting of those of the formulae:

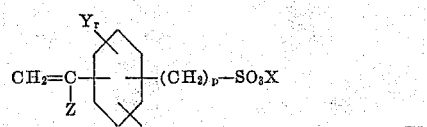
(II)

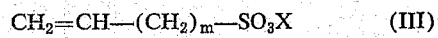
(III)

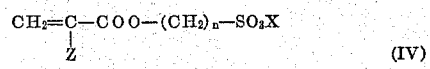
(IV)

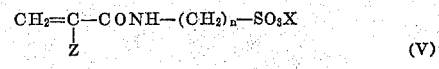
(V)

and

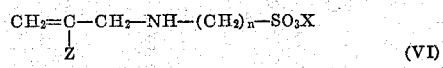
(VI)

wherein X is selected from the group consisting of hydrogen, aliphatic hydrocarbon radicals containing from 1 to about 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) between about 90 and about 10 weight percent, based on composition weight, of a copolymer of a N-vinyl-2-oxazolidinone and a N-vinyl lactam, said copolymer being from about 10 to about 90 weight percent, based on copolymer weight, of a N-vinyl-2-oxazolidinone monomer copolymerized with from about 90 to about 10 weight percent, based on copolymer weight, of a N-vinyl lactam monomer; until between about 0.5 and about 20 weight percent of said graft copolymer, based on resulting dry composition weight, is incorporated in said aquagel; and drying said graft-copolymer containing aquagel to convert it from the aquagel condition to a finished shaped article form.

12. The method of claim 11, wherein said acrylonitrile polymer is polyacrylonitrile.

13. The method of claim 11, wherein said copolymer is a copolymer of N-vinyl-5-methyl-2-oxazolidinone and N-vinyl-2-pyrrolidone.

14. A graft copolymer of between about 10 and about 90 weight percent of (a) a mixture of monomers consisting of (1) from about 10 to about 90 mole percent of an acrylate monomer of the formula:

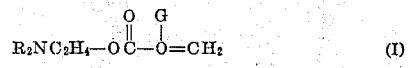
(I)

wherein each R is independently selected from the group consisting of hydrogen, methyl and ethyl and G is selected from the group consisting of hydrogen and methyl; and (2) from about 90 to about 10 mole percent of an alkenyl-group containing organic sulfonic acid compound selected from the group of those represented by the formulae:

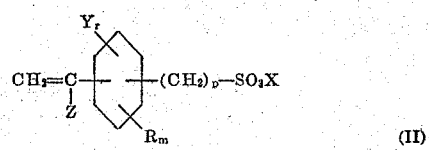
(II)

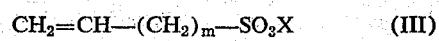
(III)

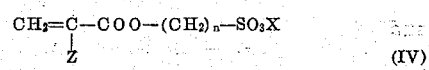
(IV)

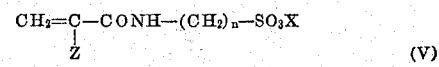
(V)

and

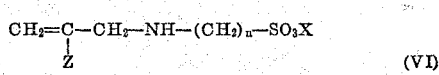
(VI)

wherein X is selected from the group consisting of hydrogen, aliphatic hydrocarbon radicals containing from 1 to about 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to about 10 weight percent of a copolymer of a N-vinyl-2-oxazolidinone and a N-vinyl lactam, said copolymer being from about 10 to about 90 weight percent, based on copolymer weight, of a N-vinyl-2-oxazolidinone monomer copolymerized with from about 90 to about 10 weight percent, based on copolymer weight, of a N-vinyl lactam monomer.

15. The graft copolymer of claim 14, containing, in polymerized form, from about 20 to about 80 weight percent of about equal molar proportions of said mixture of monomers as graft copolymerized substituents upon from about 80 to about 20 weight percent of said N-vinyl-2-oxazolidinone/N-vinyl lactam copolymer.

16. The graft copolymer of claim 14, wherein said mixture of monomers consists of (1) from about 30 to about 70 mole percent of said acrylate monomer of said Formula 1 and (2) from about 70 to about 30 mole percent of said monomeric organic sulfonic acid compound selected from the group consisting of those represented by the Formulae II, III, IV, V and VI.

17. The graft copolymer of claim 14, wherein said copolymer is a copolymer of N-vinyl-5-methyl-2-oxazolidinone and N-vinyl-2-pyrrolidone.

18. Method for the preparation of a graft copolymer which comprises polymerizing in the presence of from about 90 to about 10 weight percent, based on resulting graft copolymer weight, of a N-vinyl-2-oxazolidinone/N-vinyl lactam copolymer, said copolymer being from about 10 to about 90 weight percent, based on copolymer weight, of a N-vinyl-2-oxazolidinone monomer copolymerized with from about 90 to about 10 weight percent, based on copolymer weight, of a N-vinyl lactam monomer, between about 10 and about 90 weight percent of a mixture of monomers consisting of (a) from about 10 to about 90 mole percent of an acrylate monomer of the formula:

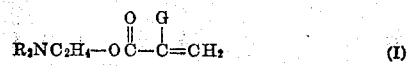
(I)

wherein each R is independently selected from the group consisting of hydrogen, methyl and ethyl and G is selected from the group consisting of hydrogen and methyl; and (b) from about 90 to about 10 mole percent of a monomeric organic sulfonic acid compound selected from the group consisting of those represented by the formulae:

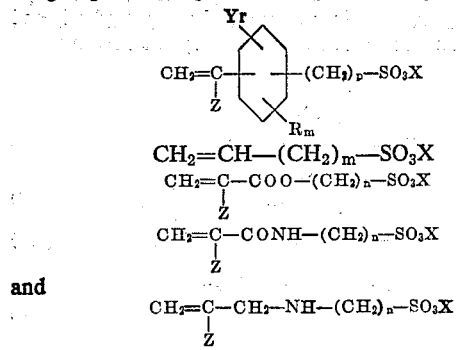

$$CH_2=CH-(CH_2)_m-SO_3X \quad (III)$$

$$CH_2=C-COO-(CH_2)_n-SO_3X \quad (IV)$$
$$\phantom{CH_2=C-COO-(CH_2)_n-SO_3X}|$$
$$\phantom{CH_2=COO-(CH_2)_n-SO_3X}Z$$

$$CH_2=C-CONH-(CH_2)_n-SO_3X \quad (V)$$
$$\phantom{CH_2=CCONH-(CH)}|$$
$$\phantom{CH_2=CCONH-(CH)}Z$$

and $$CH_2=C-CH_2-NH-(CH_2)_n-SO_3X \quad (VI)$$
$$\phantom{CH_2=CCHNHCHSO}|$$
$$\phantom{CH_2=CCHNHCHSO}Z$$

wherein X is selected from the group consisting of hydrogen, aliphatic hydrocarbon radicals containing from 1 to about 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4.

References Cited in the file of this patent

UNITED STATES PATENTS 2,558,734 Cresswell _____ July 3, 1951
2,861,101 Tousignant et al. _____ Nov. 18, 1958